US006967471B2

(12) United States Patent
Paulos

(10) Patent No.: US 6,967,471 B2
(45) Date of Patent: Nov. 22, 2005

(54) SWITCHING MODE REGULAR FOR SFP ETHERNET ADAPTOR

(75) Inventor: John James Paulos, Austin, TX (US)

(73) Assignee: Cicada Semiconductor Corporation, Austin, TX (US)

( * ) Notice: Subject to any disclaimer, the term of this patent is extended or adjusted under 35 U.S.C. 154(b) by 80 days.

(21) Appl. No.: 10/754,250

(22) Filed: Jan. 9, 2004

(65) Prior Publication Data

US 2005/0151523 A1 Jul. 14, 2005

(51) Int. Cl.$^7$ .............................................. G05F 1/40
(52) U.S. Cl. ..................................................... 323/282
(58) Field of Search ................................ 323/271, 282, 323/283, 285, 286

(56) References Cited

U.S. PATENT DOCUMENTS

| 5,532,524 A | * | 7/1996 | Townsley et al. ............. 307/64 |
| 6,400,126 B1 | * | 6/2002 | Zuniga et al. ............... 323/282 |
| 6,600,298 B2 | * | 7/2003 | McDonald et al. .......... 323/271 |
| 6,737,840 B2 | * | 5/2004 | McDonald et al. .......... 323/271 |

FOREIGN PATENT DOCUMENTS

EP            284306 A2 *  9/1988   .......... H02M 3/335

* cited by examiner

Primary Examiner—Adolf Berhane

(57) ABSTRACT

Switching node regulator for sfp ethernet adaptor. A method is disclosed for regulating voltage on an integrated circuit formed on a substrate to power circuitry on the substrate. An unregulated power supply is provided as an input to the integrated circuit connected between a positive node and a reference node on the integrated circuit. Current is sourced in a first current sourcing step through drive circuitry on the substrate from the positive node to an inductor/capacitor reactive circuit external to the integrated circuit. The output of the inductor/capacitor reactive circuit comprises a filtered regulated power supply voltage that is operable to power at least a portion of the circuitry on the substrate. Current is sourced in a second current sourcing step through the drive circuitry on the substrate from the reference node to the inductor/capacitor reactive circuit when the current in the inductor is ramping down. A controller is operable to control the first and second sourcing steps to alternately source current to the inductor/capacitor reactive circuit from the positive and reference nodes. The controller is further operable to prevent substantially any current from being drawn through the substrate body during either the first current sourcing step or the second current sourcing step and delivered to the inductor/capacitor reactive circuit during ramp up or ramp down of the current in the inductor/capacitor reactive circuit and during any transition there between.

58 Claims, 10 Drawing Sheets

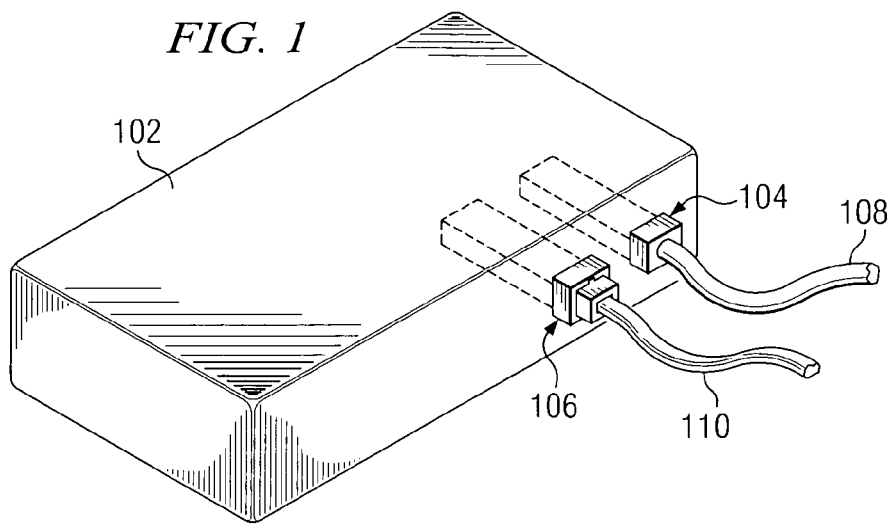
FIG. 1
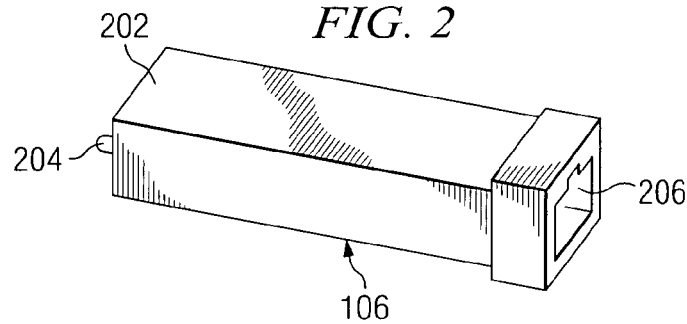
FIG. 2
FIG. 3
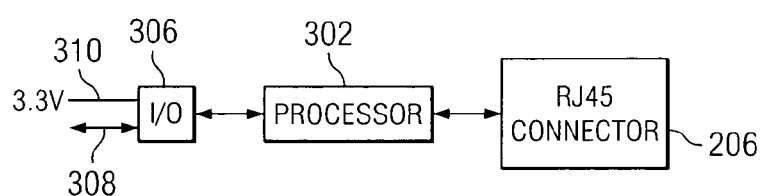
FIG. 4
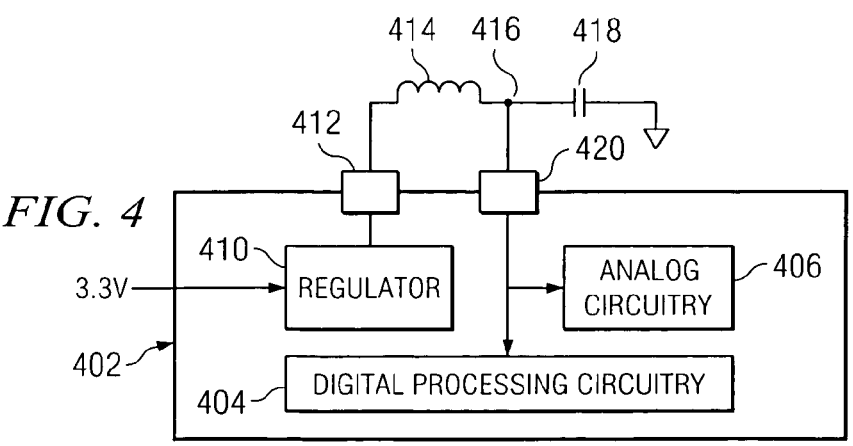

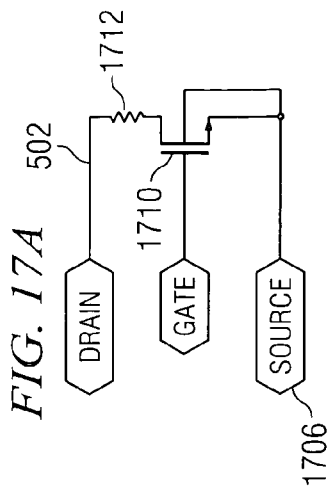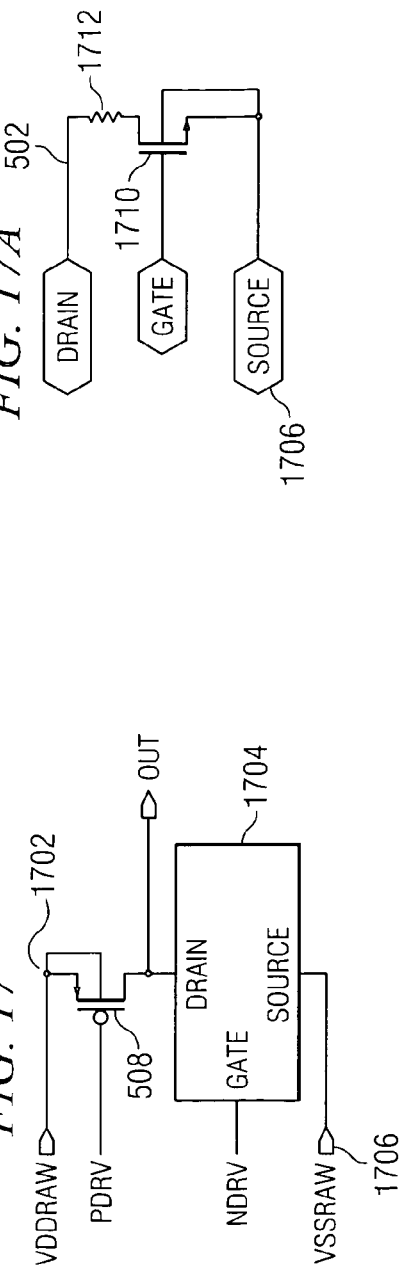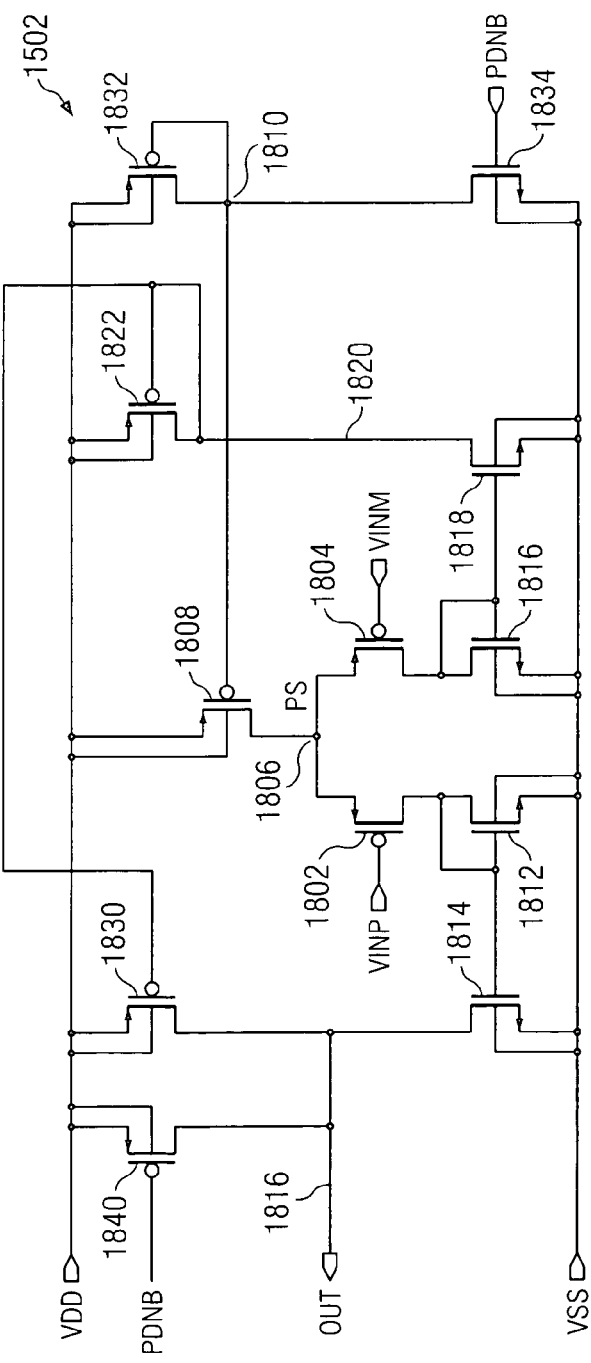

SWITCHING MODE REGULAR FOR SFP ETHERNET ADAPTOR

TECHNICAL FIELD OF THE INVENTION

The present invention pertains in general to voltage regulators and, more particularly, to a switching mode voltage regulator for a Small Form-Factor Pluggable (SFP) gigabit ethernet adaptor.

BACKGROUND OF THE INVENTION

Ethernet adaptors are utilized to communicate between network nodes through various transmission mediums. A node in a network utilizes an ethernet adaptor at that node to allow communication with a "switch" via a desired transmission medium. This transmission medium could be a CAT5 cable, an optical fiber cable or a coax cable. The hub is operable to interface with the particular transmission medium in a predetermined manner, and is operable to interconnect any given node with other nodes on the network.

Each ethernet adaptor requires the processing capability necessary to interface with a particular transmission medium in accordance with a predetermined protocol. CAT5 cable and coax utilize what is referred to as "copper" wire connections, whereas optical systems utilize an optical fiber. Both of these different mediums utilize distinctly different communication techniques, which are well known in the art. In order to provide the versatility of a given hub, manufacturers have recently adopted a pluggable package configuration that allows modules to be inserted into various slots to accommodate different transmission mediums. One type of pluggable module is referred to as a Small Form-Factor Pluggable (SFP) module. The SFP has a fairly restrictive specification that defines the input/output configuration for adapting or for mating with a particular slot, the power requirements and data transmission characteristics thereof, etc. Of these, each SFP has a limited power budget and a defined input voltage, of 3.3 volts. Thus, the only voltage available to the SFP is this 3.3 volt level, with a maximum power requirement of approximately 1.0 watts.

This limited power budget presents a problem when adapting multiple ethernet configurations to an SFP. As the upper end frequency of the ethernet adaptor increases, so does the processing power required to accommodate such high bandwidths, such as one gigabit, two gigabit and ten gigabit configurations. This processing is typically provided by a Digital Signal Processor (DSP), which requires a considerable amount of power to operate. Further, due to the density level of the chip and the associated manufacturing process, the voltage level associated with the DSP is typically 1.2 volts, utilizing a 0.13 micron process. This presents a problem to the designer of the SFP in that some type of voltage regulation is required in order to provide a step down in voltage from 3.3 volts to 1.2 volts. This has been heretofore accommodated by utilizing separate voltage regulator chips. Typically, these voltage regulator chips, for efficiency reasons, utilize a synchronous switcher. This synchronous switcher is operable to utilize some type of reactive circuit, such as an inductor and capacitor, and one or more switches to switch current to the reactive element from the supply and from ground. However, these typically require a separate integrated circuit to be fabricated and disposed within the SFP, thus increasing the cost of the part. One reason that such a separate chip is required is that the technology utilized to realize the synchronous switcher involves a manufacturing process different from the manufacturing process associated with the ethernet adaptor. Typically, bipolar technology or BiCMOS technology is utilized in the synchronous switcher, whereas primarily CMOS technology is utilized in the circuitry of the ethernet adaptor circuit. Thus, utilizing conventional synchronous switcher fabrication processors in conjunction with the CMOS technology for the ethernet adaptor circuit teaches against integrating the synchronous switcher onto the same chip with the ethernet adaptor. Further, when analog and digital circuitry are combined on the same integrated circuit in combination with switching transistors associated with the switcher functionality, there exists the possibility for forward biasing of the substrate diode due to the inductive element associated with the switcher pulling the voltage on a node below the substrate voltage. This can introduce unwanted noise into the substrate.

SUMMARY OF THE INVENTION

The present invention disclosed and claimed herein, in one aspect thereof, comprises a method for regulating voltage on an integrated circuit formed on a substrate to power circuitry on the substrate. An unregulated power supply is provided as an input to the integrated circuit connected between a positive node and a reference node on the integrated circuit. Current is sourced in a first current sourcing step through drive circuitry on the substrate from the positive node to an inductor/capacitor reactive circuit external to the integrated circuit. The output of the inductor/capacitor reactive circuit comprises a filtered regulated power supply voltage that is operable to power at least a portion of the circuitry on the substrate. Current is sourced in a second current sourcing step through the drive circuitry on the substrate from the reference node to the inductor/capacitor reactive circuit when the current in the inductor is ramping down. A controller is operable to control the first and second sourcing steps to alternately source current to the inductor/capacitor reactive circuit from the positive and reference nodes. The controller is further operable to prevent substantially any current from being drawn through the substrate body during either the first current sourcing step or the second current sourcing step and delivered to the inductor/capacitor reactive circuit during ramp up or ramp down of the current in the inductor/capacitor reactive circuit and during any transition there between.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a perspective view of a module for receiving an SFP network adaptor;

FIG. 2 illustrates a perspective view of one of the SFPs;

FIG. 3 illustrates a simplified schematic diagram of the SFP;

FIG. 4 illustrates a more detailed schematic diagram of the processor in the SFP;

FIG. 17A illustrates a schematic diagram of the N-channel drive transistor;

FIG. 18 illustrates a schematic diagram of the comparator;

DETAILED DESCRIPTION OF THE INVENTION

Figure 5:
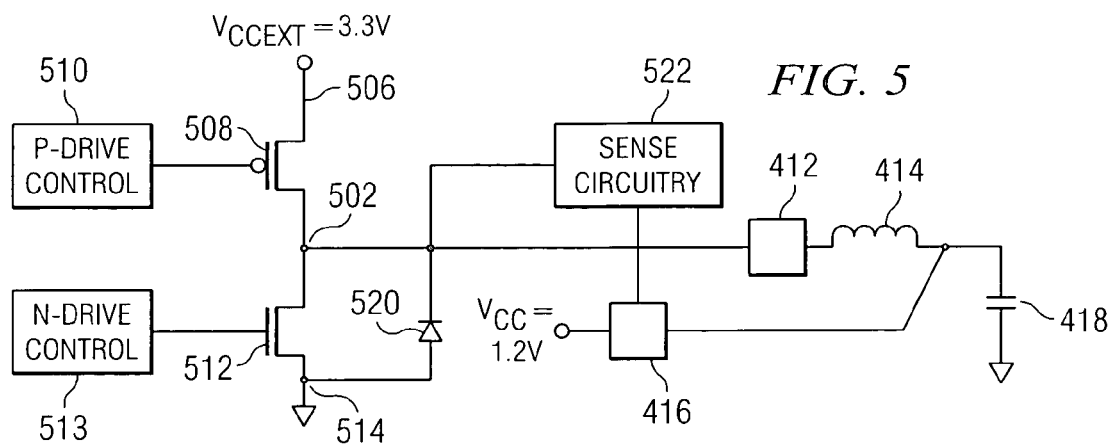
FIG. 5 illustrates a simplified schematic of the regulator.

Referring now to FIG. 1, there is illustrated a perspective view of a conventional switch box or panel 102 that is operable to interface with a plurality of different network transmission cables. This panel or switch box 102 can be disposed on a network rack and is adaptable to accept various functional modules to define the functionality of the transmission medium. Illustrated in FIG. 1 are two such insertible modules 104 and 106. However, it should be understood that many more modules and other interface adaptors could be utilized in this switch box or panel 102.

The pluggable module 104 is a module that can be inserted into a "slot" on the front of the panel 102 and allow the panel 102 to interface with an optical fiber 108. An alternative configuration is provided by the module 106, which is adaptable to interface with a copper transmission medium through a CAT5 cable 110 that can allow the panel 102 the ability to interface with a 10/100/1000BASET transmission medium. Although data is transmitted over both cables 108 and 110, the protocols and transmission characteristics of both are different. As such, the panel 102, without the modules 104 and 106, would have to be permanently configured to interface with either optical or CAT5 cables. This can present a problem if it must be preconfigured. With the use of pluggable modules, a defined number of slots can be provided and then the characteristics of the transmission medium associated with that slot defined by the pluggable module. These pluggable modules are referred to as Small Form-Factor Pluggable (SFP) modules. They have a defined electrical interface with a set power supply voltage, data I/O and specifications as to the amount of power that can be provided to that module.

Referring now to FIG. 2, there is illustrated a perspective view of the module 106, associated with the CAT5 cable 110. The module 106 typically has an elongated insertible body 202 that is adaptable to be inserted into a slot on the front of the panel 102. At the back of the elongated body 110 is provided an I/O interface 204 that allows an electrical connection with the slot. An RJ45 connector receptacle 206 is provided on the front of the module for receiving an RJ45 connector at the end of the cable 110. As noted herein above, the power for the module 106 is received from the slot and panel 102 in accordance with predetermined specifications associated with SFPs. This is typically a one watt maximum.

Referring now to FIG. 3, there is illustrated a simplified diagrammatic view of the operation of module 106. A part of module 106 is a processor 302 that is operable to interface between the protocol on the I/O side of the module 106 associated with the operation of the panel 102 and on the connector side. Therefore, the processor 302 on one side interfaces with the RJ 45 connector receptacle 206, on the other side thereof with an I/O interface 306. The I/O interface 306 is operable to interface with the panel 102 for transmission of data on data/control lines 308 and with a 3.3 voltage source on a power supply line 310. In one example of operation, the RJ45 connector receptacle 206 side operates in a conventional manner with a conventional format, but the I/O interface side may operate with a different data format such as SerDes GMII (SGMII) in order to reduce the number of wires that exist on the PC boards, i.e., the number of data lines, etc. that must be run on a PC board. The processor 302 transmits and receives data in this format on the I/O side and, on the connector side, it can adapt to multiple different formats. For example, if it were an optical fiber, it would use a SerDes format. However, the processor 302 must perform all of these functions with a power budget that is limited to that defined by the SFP specification. Therefore, the processor 302 can include one or more discreet chips for operation thereof, or it could include a single chip. In the present embodiment, this processor 302 is a single chip PHY device. It is operable to provide operations up to a one gigabit data rate, which requires an internal processing section that operates on a 1.2 volt level due to the semiconductor process involved in fabricating such high density integrated circuit—a 0.13 $\mu$m CMOS process. Therefore, to utilize such technology, some type of voltage step down is required which, in the disclosed embodiment, is an on-chip voltage regulator section.

Referring now to FIG. 4, there is illustrated a simplified block diagram of a PHY chip 402 that is operable to provide the functionality of the processor 302. It includes thereon a digital section 404 for containing digital processing circuitry and an analog section 406 for containing the various analog circuitry associated with the operation of the device. Typically, the I/O side of the processor 302 in FIG. 3 is digital, whereas the transmission side involves analog operations such that there must be some conversion between an analog domain and a digital domain. To facilitate this, mixed signal technology must be utilized on the processor chip 402, this being conventional.

To facilitate high speed operation at high data rates such as one gigabit, the processing technology utilized is 0.13 micron CMOS process technology, that inherently requires a supply voltage level of 1.2 volts. Since this differs from the 3.3 volt level, there is provided an on-chip regulator circuit 410 that is operable to provide regulation capability for the integrated circuit 402 and convert the 3.3 volt level to a 1.2 volt level. This regulator circuit 410 incorporates synchronous switching circuitry that requires external components. Therefore, the regulator circuit 410 provides an output on a pad 412 to one side of an external inductor 414, the other side thereof connected to a node 416. Node 416 is connected to one side of a supply capacitor 418, the other side thereof connected to ground. Node 416 provides the filtered output and is connected to a pad 420 on the integrated circuit 402 to provide a regulated supply voltage level. The regulator circuit 410, as described herein above, provides very careful control of current that is supplied to the inductor 414 so as to minimize the amount of "switching" noise that is coupled to the analog circuitry 406, which noise would be detrimental to the overall operation of the system. Further, as will be described herein below, the regulator 410 is fabricated with technology consistent with that associated with the fabrication of the digital processing circuitry 404 and the analog circuitry 406.

Referring now to FIG. 5, there is illustrated a schematic diagram of the output section of the regulator 410. The pad 412 is associated with an output node 502. This is the drive node for the regulator 410. This node has current driven thereto from a supply terminal 506 that is associated with the external $V_{DD}$ voltage at 3.3 volts, which is referred to as the "raw" voltage. A P-channel transistor 508 is provided with the source-to-drain path connected between supply terminal 506 and node 502. The gate of transistor 508 is controlled by a P-drive control block 510. An N-channel transistor 512 has the source-to-drain path connected between the output drive node 502 and the ground node 514. The gate of transistor 512 is controlled by an N-drive control block 513.

The use of an N-channel transistor 512 with conventional CMOS fabrication technology results in the fabrication of an N-channel transistor that has associated therewith a substrate diode 520 sometimes referred to as a "catch" diode in switching power supply applications. This substrate diode 520 provides a PN junction with the N-side thereof comprising the drain of transistor 512 and the P-side thereof comprising the substrate. The substrate is connected to ground on the metalized side thereof. As such, if node 502 is allowed to go below the voltage of the ground node 514 by more than the threshold voltage of the diode 520, it will conduct and substrate current will be drawn.

The operation of the P-drive control block 510 and N-drive control block 513 are controlled by various internal blocks in the regulator 410 which utilize information regarding the dynamic operation of node 502 and the output regulator voltage, as determined by various control circuitry in a block 520. The control is such that current is sourced to the node 502 from the power supply node 506 when node 502 is at a potential above ground and is sourced from ground node 514 through transistor 512 when the node 502 is at a potential below ground node 514. The transition from high to low and from low to high is controlled by block 520, wherein both transistors 508 and 512 during a transition are dynamically controlled.

Figure 6:
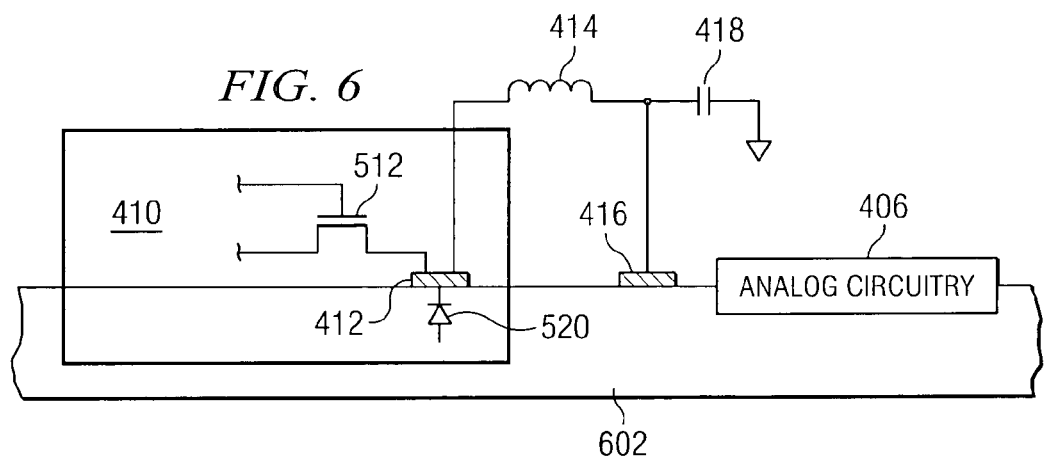
FIG. 6 illustrates a cross-sectional view of the semiconductor circuit on which the processor of FIG. 4 is fabricated.

Referring now to FIG. 6, there is illustrated a cross-sectional view illustrating the problem with drawing current through the substrate diode 520. A substrate 602 is illustrated having disposed thereon the regulator block 410 and the analog circuitry block 406. It can be seen that the transistor 512 was formed on the surface of the substrate and is connected to the pad 412 which has the diode 520 associated therewith. With the use of two drive transistors, one for driving current to the node 502 from the supply node 506 and one for driving current to a node from a ground terminal 514, it is important that the timing associated with each of these transistors 508 and 512 is controlled, since it is critical to proper operation of the synchronous switcher which is a pulse width modulation (PWM) circuit. It is noted that, in steady state operation, current is continually flowing out of the node 502 and through the conductor 414. This is true both when the output is high (inductor current ramping up) and when the output is low (inductor current ramping down). In general, on a short time scale, the inductor 414 can be treated as a current source with a value near the average load current. While the dI/dt at the output is quite low, the dI/dt on the supply and ground sides of the P-channel transistor 508 and the N-channel transistor 512 is very high, on the order of $1 \times 10^8$ Amps/second. Even at 5 nH of bond wire inductance, this can cause a large transient on the power supply or ground terminal.

If the control signals provided by the P-drive control block 510 and the N-drive control block 513 are adjusted such that they do not overlap at all, the output will fall until the output current is supported by conduction through the diode 520, resulting in massive substrate current and currents with substrate noise. It can be seen in FIG. 6 that this current is distributed underneath the analog circuitry, such that the noise can be reflected in the analog circuitry and cause a problem. This is true on both rising and falling transitions. Alternatively, if the P-drive control block 510 and N-drive control block 513 are controlled such that the drives overlap too much, then excessive power dissipation will result due in part to shoot-through current directly from $V_{DD}$ to ground. If the drive transitions happen too quickly, high dI/dt occurs in the $V_{DD}$ and ground bond wires, resulting in excessive supply and ground noise. The low-to-high and high-to-low transition are asymmetric, because of the tendency for the output to fall without overlap. Thus, very careful control of these drive signals to provide for optimal low-to-high operation and high-to-low transition has been provided in the P-drive control block 510 and N-drive control block 513, as will be described in more detail herein below.

Figure 7:
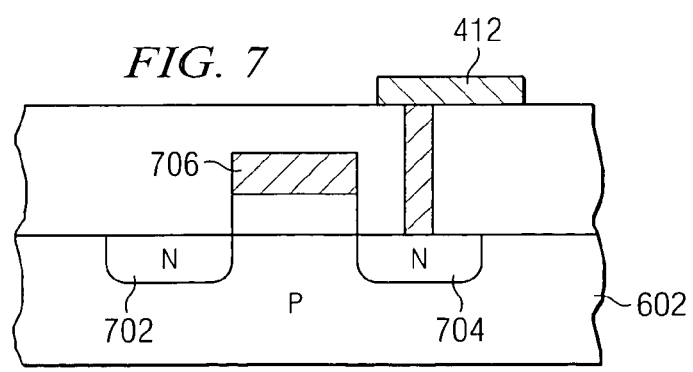
FIG. 7 illustrates a cross-sectional view of the N-channel drive transistor.

Referring now to FIG. 7, there is illustrated a cross-sectional view of the N-channel transistor 512 illustrating an N-type source region 702, and N-type drain region 704 separated by a channel region over which a gate electrode 706 is disposed. Since the substrate 602 is a P-type substrate, this results in a PN junction existing between drain 704 and substrate 602. Drain 704 is connected to the output pad 412 and this can result in substrate current through the PN junction if pad 412 falls below ground such that this PN junction is forward biased.

Figure 8:
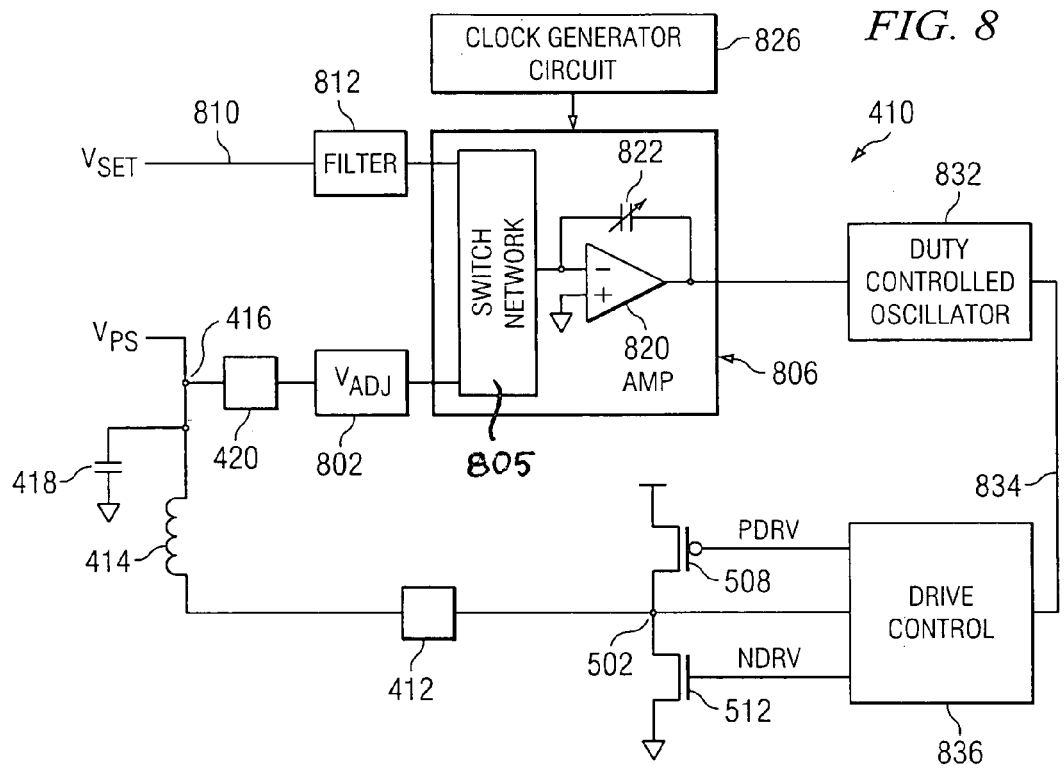
FIG. 8 illustrates a more detailed diagrammatic view of the regulator.

Referring now to FIG. 8, there is illustrated a more detailed diagrammatic view of the regulator 410. The regulated supply voltage is provided on the node 416 which is input through the pad 420 to the regulator circuit 410. This regulated power supply voltage, as noted herein above, is approximately 1.2 volts with a raw power supply input of 3.3 volts. This regulated power supply voltage level is input to a voltage adjust circuit 802 which is operable to introduce a voltage adjustment by adding or subtracting voltage from the regulated voltage input. The adjusted power supply voltage is then input to one input of a switched capacitor integrator circuit 806. A set voltage, $V_{SET}$, is input on a node 810 and filtered with a filter 812 and input to a second input of the switched capacitor integrator 806. The switched capacitor integrator circuit 806 is operable to integrate the difference between the set voltage and the adjusted regulated voltage. The switched capacitor integrator circuit 806 includes a switch network 805 that is operable to switch the output of the filter 812 or the output of the voltage adjust circuit 802 for input to the negative input of an operational amplifier 820 internal to the switched capacitor integrator circuit 806. The positive input of the operational amplifier 820 is connected to ground or $V_{SS}$. A programmable capacitor 822 is connected between the negative input of the operational amplifier to a node 824 that comprises the output of the switched capacitor integrator circuit 806. The switching operation of the switched capacitor integrator 806 is controlled by a clock generator circuit 826.

The output of the operational amplifier 820 is input to a duty cycle controlled oscillator 832, which has the duty cycle thereof controlled by the analog output of operational amplifier 820. This provides a clock signal on an output 834 that is input to a drive control block 836. Drive control block 836 provides the PDRV and NDRV signals that comprise the outputs of the drive control blocks 510 and 513 in FIG. 5. These are output to drive the P-channel transistor 508 and the N-channel transistor 512, respectively. The drive control block 836 receives a feedback signal from the output node 502 which is the unfiltered output of the regulator circuit 410 to pad 412.

In operation, the output of the switched capacitor integrator 806 integrates the difference between the voltage on the pad 420 and the voltage, $V_{SET}$, on node 810. This result is output to the duty cycle controlled oscillator 832. This then varies the drive to the transistors 508 and 512 in a feedback loop. As will be described herein below, this regulator circuit 410 provides regulation of the voltage on pad 420 using an on-chip PWM (Pulse Width Modulation) driver and an off-chip LC filter. The set point is a programmable set point.

Figure 9:
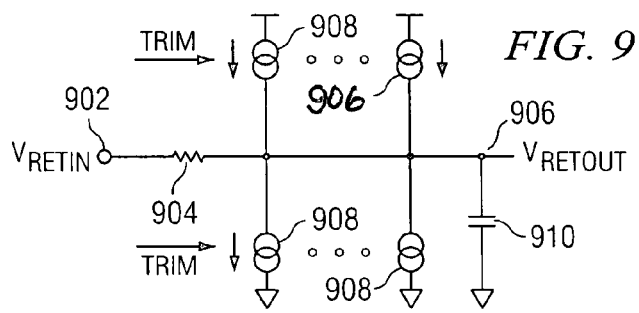
FIG. 9 illustrates a schematic diagram of the feedback adjust circuit.

Referring now to FIG. 9, there is illustrated a schematic diagram of the feedback voltage adjustment circuit 802. The voltage on pad 420 is input to an input 902 labeled Vretin which represents the filtered output. This is input to one side of a series resistor 904, the other side thereof connected to a node 906. A plurality of selectable current sources 908 are connected between the power supply voltage node and node 906 for sourcing current thereto in incremental amounts, such incremental amounts programmably selected based upon the value of a TRIM signal. Similarly, a plurality of selectable current sinks 908 are connected between node 906 and ground for sinking current therefrom in incremental amounts, such incremental amounts programmably selected based upon the value of the TRIM signal. Node 906 is connected to one side of a capacitor 910, the other side thereof connected to ground. Node 906 provides the adjusted regulated voltage output Vretin. The resistor 902 and capacitor 910 provide an RC filter.

Figure 10:
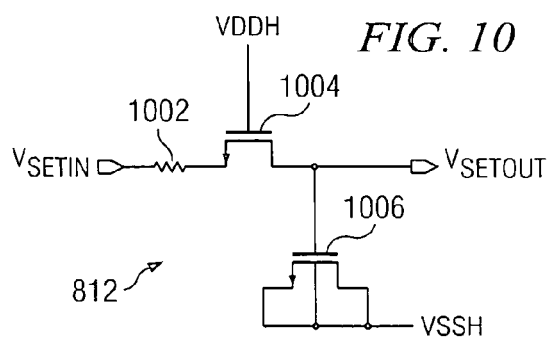
FIG. 10 illustrates a schematic diagram of a filter for the reference input.

Referring now to FIG. 10, there is illustrated a schematic diagram of the filter 812. The set point voltage, Vsetin, is input to one side of the series resistor 1002, the other side thereof connected to one side of an N-channel transistor 1004 to an output Vsetout. The gate of transistor 1004 is connected to the raw power supply voltage $V_{DDH}$. A capacitively configured transistor 1006 is connected between the output and $V_{SS}$.

Figure 11:
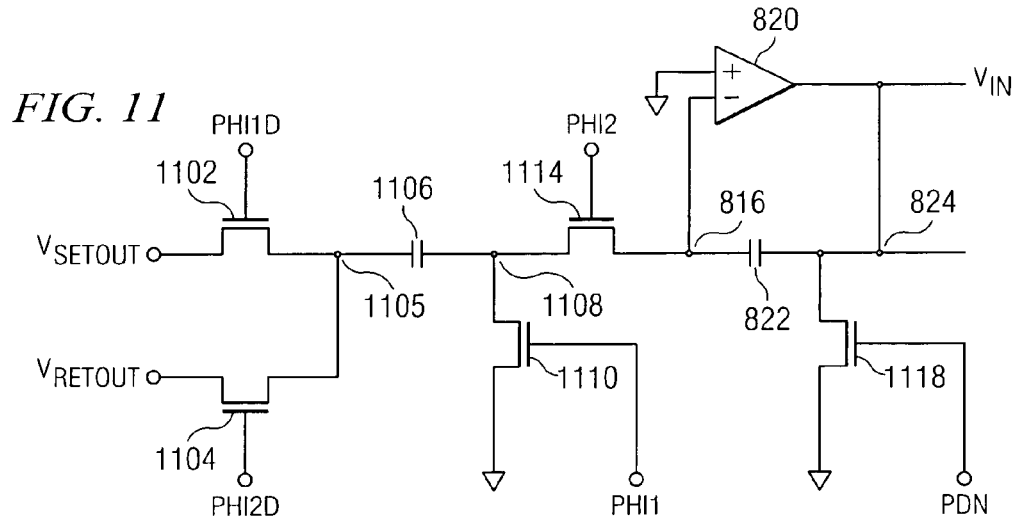
FIG. 11 illustrates a schematic diagram of a switched capacitor integrator.

Referring now to FIG. 11, there is illustrated a diagrammatic view of the operational amplifier 820 and the switch capacitor input. The set point voltage Vsetout from the filter 812 is input to one side of an N-channel transistor 1102, the other side thereof connected to a node 1105. The gate of transistor 1102 is controlled by a clock signal phi1d, a delayed clock, phi1. The feedback signal output by the feedback voltage adjust circuit 802, Vretout, is input to one side of an N-channel transistor 1104, the other side thereof connected to node 1105 and the gate thereof connected to a delayed clock signal phi2d. Node 816 is connected to one side of a capacitor 1106, the other side thereof connected to a node 1108. Node 1108 is connected to one side of a switching transistor, an N-channel transistor, 1110, the other side thereof connected to ground and the gate thereof connected to the clock signal phi1. Node 1108 is connected to node 816 by a switching transistor 1114, the gate thereof connected to a clock signal phi2. Node 816 is connected to one side of the capacitor 822, the other side thereof connected to the output node 824. Output node 824 is connected to ground with a switching transistor 1118 under the control of the power down signal PDN, which is low during operational mode, such that it is inactive during that time.

In operation, the switched capacitor integrator illustrated in FIG. 11 is operable to take the difference between the two voltages Vsetout and Vretout. Vsetout is connected through transistor 1102 to one side of the capacitor 1106 while the other side on node 1108 is connected to ground through transistor 1110. Thereafter, Vretout is connected through transistor 1104 to capacitor 106 while the other side on node 1108 is tied to node 816 through transistor 1114 thereby transferring charge to capacitor 822.

Figure 12:
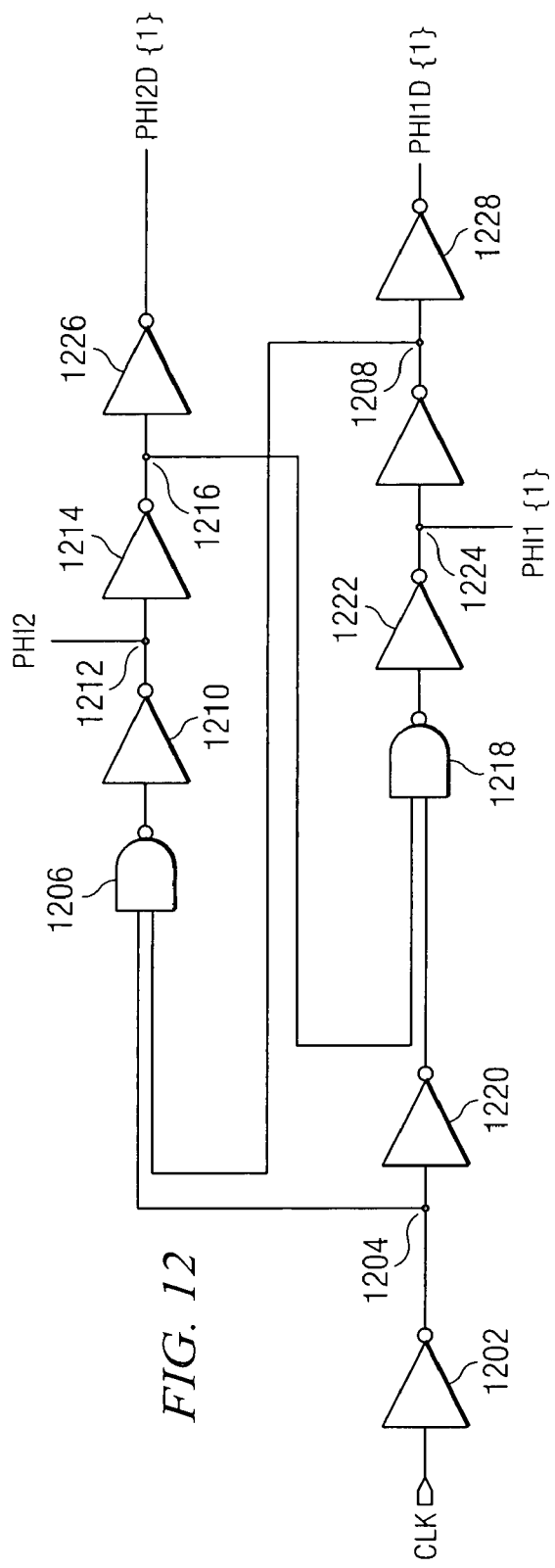
FIG. 12 illustrates a schematic diagram of a non-overlap clock generator for driving the switch capacitor generator of FIG. 11.

Referring now to FIG. 12, there is illustrated a logic diagram for the clock generator 826 for generating the clock signals for the switched capacitor integrator. A main clock signal, clk, is input to an inverter 1202, the output thereof connected to a node 1204. Node 1204 is connected to one input of a NAND gate 1206, and the other input thereof connected to a node 1208. The output of NAND gate 1206 is input to an inverter 1210, the output thereof connected to a node 1212 to provide the phi2 clock signal. Node 1212 is connected to the input of an inverter 1214, the output thereof connected to a node 1216, node 1216 connected to one input of a NAND gate 1218, the other input of the NAND gate 1218 connected to the output of an inverter 1220, the input of inverter 1220 connected to node 1204. The output of NAND gate 1218 is connected to the input of an inverter 1222, the output thereof connected to a node 1224 to provide the phi1 clock signal. Node 1216 is connected to the input of an inverter 1226 to provide on the output thereof a phi2d clock signal. Node 1208 is connected to the input of inverter 1228 to provide on the output thereof the clock signal phi1d.

Figure 13:
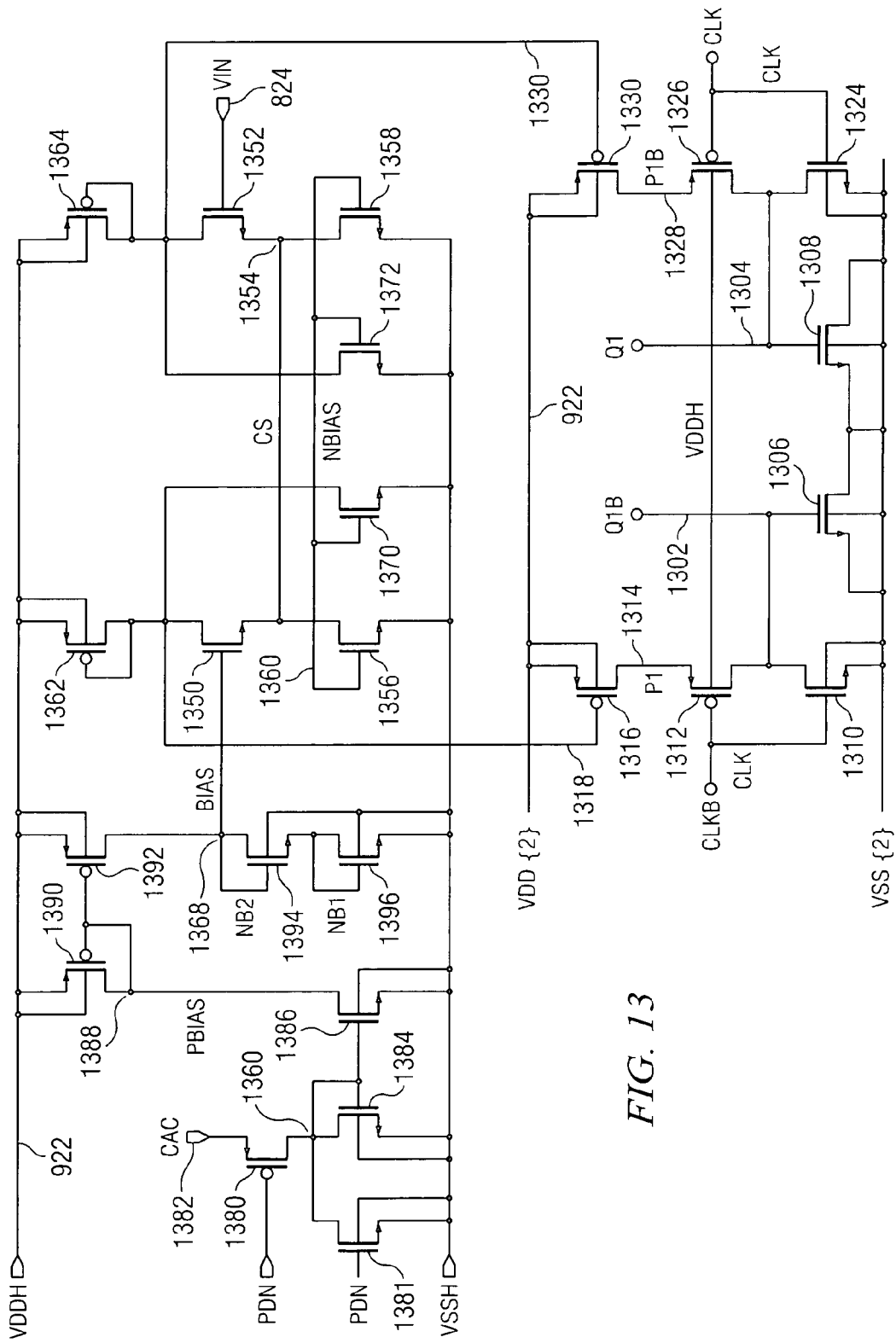
FIG. 13 illustrates a schematic diagram of a duty cycle controlled oscillator.

Referring now to FIG. 13, there is illustrated a schematic diagram of a duty cycle controlled oscillator. There are provided two output nodes, node 1302 labeled q1b and a node 1304 labeled q1. Node 1302 has a capacitively configured N-channel transistor 1306 connected between node 1302 and ground and node 1304 has a similar capacitively coupled N-channel transistor 1308 connected between node 1304 and ground. As will be described herein below, the capacitors 1306 and 1308 are independently charged and discharged and, when the duty cycle is fifty percent, they are charged and discharged at the same rate. Node 1302 is connected to one side of the source/drain path of an N-channel transistor 1310 for sinking current to $V_{SS}$, the gate thereof connected to the gate of a P-channel transistor 1312, transistor 1312 having the source/drain path thereof connected between a node 1314 and node 1302. A P-channel transistor 1316 is connected from the supply node 922 to node 1314, the gate thereof connected to a gate node 1318. The current to transistor 1316, as will be described herein below, is controlled to control the amount of current that is driven to node 1306, and the charge and discharge of capacitor 1306 is controlled by the clkb clock signal that drives the gates of transistors 1312 and 1310.

The capacitor 1308 is associated with a similar circuitry. Node 1304 is connected to one side of the source/drain path of an N-channel transistor 1324, the other side thereof connected to ground and the gate thereof connected to the clk signal. A P-channel transistor 1326 has the source/drain path thereof connected between a node 1328 and node 1304 and the gate thereof connected to the clk signal. A P-channel transistor 1330 has the source/drain path thereof connected between the power supply node 922 and node 1328 and the gate thereof connected to a gate control node 1330.

The bias for transistors 1316 and 1330 is provided by a current mirror circuit. Two common source N-channel transistors 1350 and 1352 have the source thereof connected to a common source node 1354. Node 1354 is connected through two parallel transistors 1356 and 1358 with the gates of transistors 1358 connected to a bias node 1360. A P-channel transistor 1362 has the source/drain path thereof connected between the power supply node 922 and node 1318, the gate thereof connected to the node 1318. Similarly, a P-channel transistor 1364 has the source/drain path thereof connected between the power supply node 922 and node 1330 and the gate thereof connected to node 1330 in a diode configuration. The gate of N-channel transistor 1352 comprises the output of the operational amplifier 820 on node 824 labeled VIN. The gate of transistor 1350 is connected to a bias node 1368 to provide a bias for transistor 1350. Transistors 1350 and 1352 are current steering transistors that define the current through the associated P-channel transistors 1362 and 1364, respectively. The current through transistors 1362 and 1364 is mirrored to P-channel transistors 1316 and 1330. The node 1318 is connected through the source/drain path of an N-channel transistor 1370 to $V_{SS}$, the gate thereof connected to the bias node 1360 and node 1330 is connected through the source/drain path of an N-channel transistor 1372 to $V_{SS}$, the gate thereof connected to bias node 1360.

Therefore, when $V_{IN}$ increases in value, transistor 1352 will conduct more than transistor 1350, thus decreasing the current through transistor 1362 and increasing the current through transistor 1364. This will be mirrored to the transistors 1316 and 1330, such that capacitor 1308, in this situation, will charge faster than capacitor 1306. When $V_{IN}$ on node 824 is substantially equal to the bias voltage on node 1368, then the current through both transistors 1316 and 1330 will be such that the duty cycle would be expected to be 3:1, noting that the capacitors 1306 and 1308 are designed to be asymmetric so as to set the duty cycle control range around 0.33, one being C and the other 2C.

The bias voltage on node 1368 is provided by a current mirror circuit which is comprised of a P-channel transistor 1380 connected between a current input 1382 and the nbias node 1360. The gate of transistor 1380 is connected to the power down signal which is low during active operation. An N-channel transistor 1381 is connected between node 1360 and $V_{SS}$ with the gate thereof connected to PDN. An N-channel transistor 1384 is connected between node 1360 and $V_{SS}$ with a gate thereof connected to node 1360 in a diode configuration. Node 1360 is connected to the gate of an N-channel transistor 1386 having the source/drain path thereof connected between a node 1388 and $V_{SS}$, a P-channel transistor 1390 connected between node 1388 and the power supply node 922 with a gate thereof connected to node 1388. Therefore, the current through the transistor 1380 is mirrored to the transistor 1390. The current through transistor 1390 is mirrored to the bias node 1368 with a P-channel transistor 1392 connected between node 922 and node 1368, the gate thereof connected to node 1388. Node 1368 is connected to two series connected diode connected N-channel transistors 1394 and 1396 to $V_{SS}$.

Figure 14A:
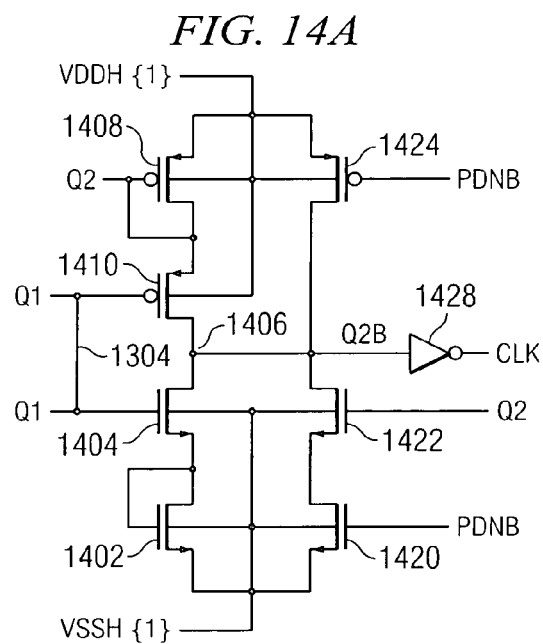
FIGS. 14A and 14B illustrate schematic diagrams of NAND gates for controlling the duty cycle of the oscillator of FIG. 13.
Figure 14B:
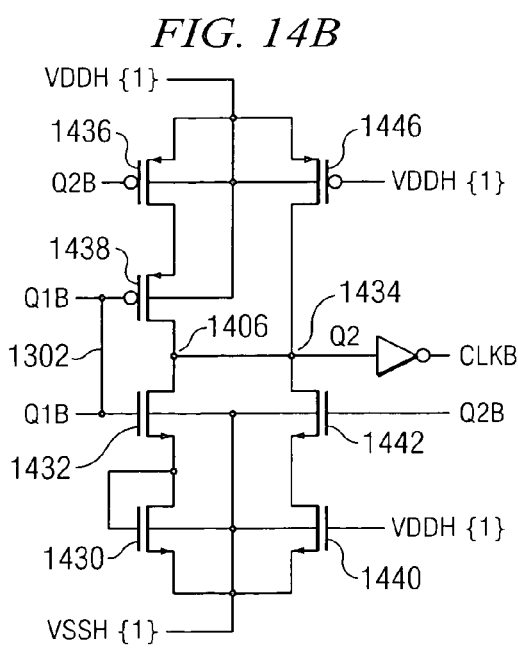

Referring now to FIGS. 14A and 14B, there is illustrated a schematic diagram of two NAND gates that are provided to generate the clk and clkb signals for input to the gates of transistors 1312 and 1326, respectively. FIG. 14A illustrates a first NAND gate which is comprised of two strings. A first string is comprised of four transistors, two P-channel transistors and two N-channel transistors. The two N-channel transistors are comprised of a first transistor 1402 that is a diode configured transistor connected between one side of the second N-channel transistor 1404 and $V_{SS}$, the other side of transistor 1404 connected to an output node 1406. The two P-channel transistors are comprised of a first P-channel transistor 1408 connected between $V_{DD}$ and one side of a second P-channel transistor 1410, the other side of transistor 1410 connected to the output node 1406. The gate of transistor 1408 is connected to a signal q2 and the gates of transistors 1410 and 1404 are connected to the q1 signal on node 1304.

The first NAND gate of FIG. 14A is further comprised of a second string of two N-channel transistors and one P-channel transistor. The two N-channel transistors are comprised of a first N-channel transistor 1420 connected between one side of a second N-channel transistor 1422 and $V_{SS}$, and the other side of the second transistor 1422 is connected to the output node 1406. The P-channel transistor is comprised of a transistor 1424 connected between output node 1406 and $V_{DD}$. The gate of transistor 1420 is connected to the inverted power down signal, PDNB, and the gate of P-channel transistor 1424 is connected PDNB. Thus, transistor 1420 will be on during normal operation and transistor 1424 off. The gate of transistor 1422 is connected to the q2 signal. The output node 1406 is connected to an inverter 1428, the output thereof providing the clk signal.

The second NAND gate of FIG. 14B is comprised of two strings also, basically identical to the structure of FIG. 14A. There are provided two N-channel transistors, a diode connected transistor 1430 in series with an N-channel transistor 1432 disposed between an output node 1434 and $V_{SS}$, two P-channel transistors 1436 and 1438 are connected in series between $V_{DD}$ and the output node 1434 with transistor 1436 disposed proximate the $V_{DD}$ terminal. The gate of transistor 1432 is connected to the signal q1b, as well as the gate of the transistor 1438, this being node 1302. Two N-channel transistors 1440 and 1442 are connected in series between the output node 1434 and $V_{SS}$, with transistor 1440 being proximate to $V_{SS}$. The gate of transistor 1440 is connected to $V_{DD}$ such that it is always on and the gate of transistor 1442 is connected to a signal q2b which is on the output node 1406 of the NAND gate of FIG. 14A. The gate of transistor 1436 is also connected to the signal q2b. The P-channel transistor 1446 is connected between $V_{DD}$ and the output node 1434, with the gate thereof connected to $V_{DD}$, such that it is off.

When node 1304, signal q1, is low during charging of capacitor 1308, node 1406 will be pulled high, resulting in the clk signal being low, which turns on transistor 1326 to charge up capacitor 1308. At the same time, node 1434 is pulled low, such that clkb is high, turning off transistor 1312 so that capacitor 1306 is not charging. When capacitor 1308 rises in potential to the trigger point where node 1406 is pulled low, this results in turning off of transistor 1442 and turning on transistors 1436 and 1438 to raise the potential of node 1434 such that clkb will go low, turning on transistor 1312 and charging capacitor 1306. The duty cycle will be a function of the amount of current that is provided to each of the capacitors 1306 and 1308 through the respective current paths, these being constant currents that are adjusted as described herein above. This operation is basically a ping-pong relaxation oscillator formed by two integrate and dump circuits in the form of the capacitor and the two cross-coupled NAND gates of FIGS. 14A and 14B. The trip point of the cross-coupled NAND gates is elevated by the diode connected devices N-channel transistors 1402 and 1430.

Each side of the oscillator receives a fixed current plus an additional part of a current which is steered by the VIN voltage output by the operational amplifier 820.

Figure 15:
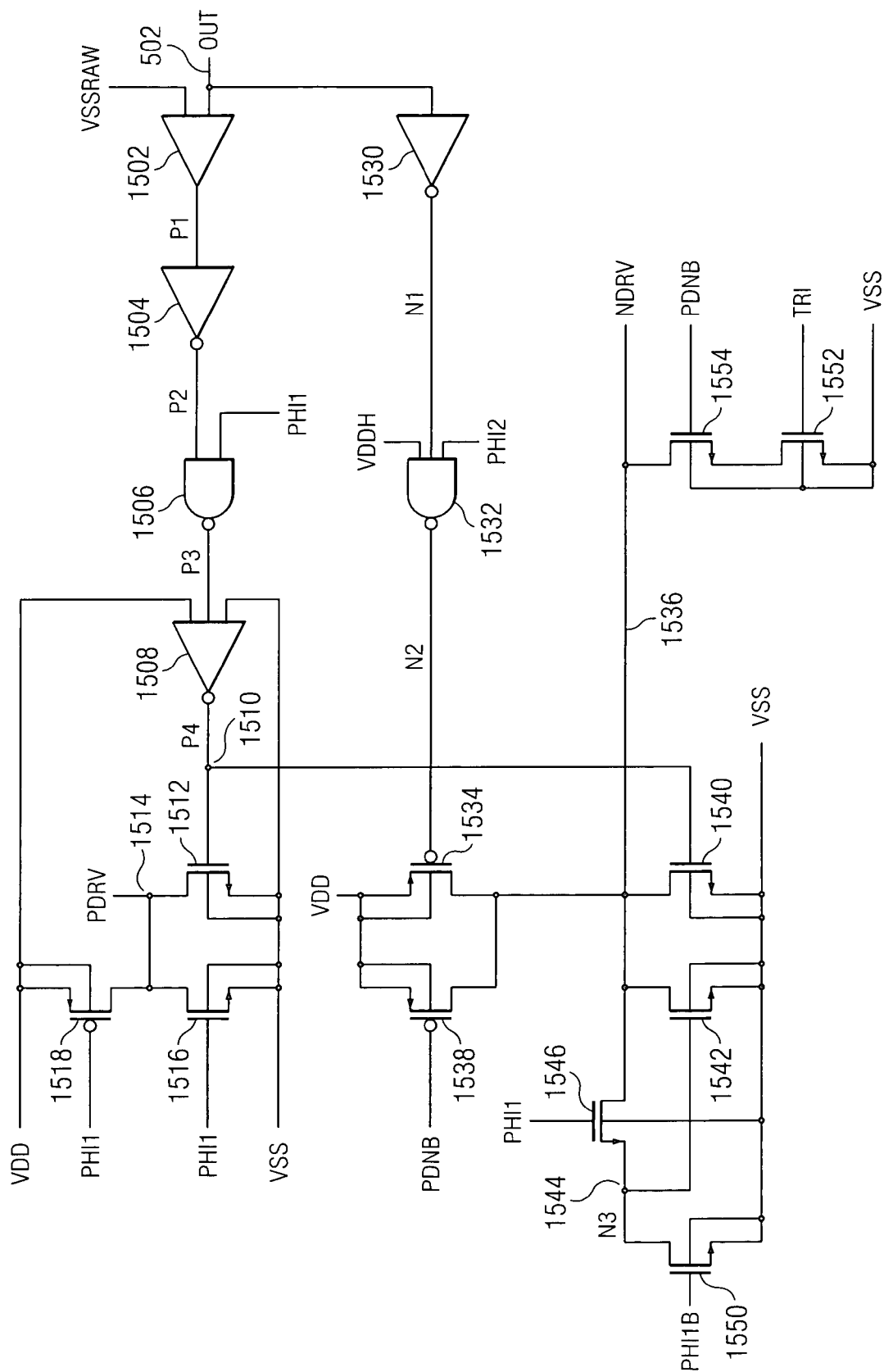
FIG. 15 illustrates a schematic diagram of the output drive block.

Referring now to FIG. 15, there is illustrated a logic diagram for the drive control block 836. A comparator 1502 is operable to compare the output on node 502, which comprises the unfiltered output of the regulator, this being received on a negative input of the comparator, vinm. The positive input, vinp, is connected to $V_{SS}$. The output of the comparator is connected through an inverter 1504 to one input of a NAND gate 1506, the other input thereof connected to a phi1 clock signal. It should be noted that the clock signals for the operation of the drive control block are different than those for the switched capacitor integrator described herein above. The output of the NAND gate 1506 is connected through an inverter 1508 to a node 1510. Node 1510 is connected to the gate of an N-channel transistor 1512 having the source/drain path thereof connected between a node 1514, providing the PDRV signal, and $V_{SS}$. An N-channel transistor 1516 is connected between node 1514 and $V_{SS}$, the gate thereof connected to the phi1 clock signal. A P-channel transistor 1518 is connected between node 1514 and $V_{DD}$, the gate thereof connected to the phi1 signal.

The unfiltered output of the regulator 502 is also connected through an inverter 1530 to one input of a NAND gate 1532, the other input thereof connected to a phi2 clock signal. The output of NAND gate 1532 is connected to the gate of a P-channel transistor 1434, the source/drain path thereof connected between $V_{DD}$ and a node 1536 that provides the NDRV signal. A P-channel transistor 1538 is connected between the supply node 922 and node 1536, the gate thereof connected to the inverse power down signal, PDNB. An N-channel transistor 1540 is connected between node 1536 and $V_{SS}$, the gate thereof connected to node 1510. An N-channel transistor 1542 is connected between node 1536 and $V_{SS}$, the gate thereof connected to a node 1544. An N-channel transistor 1546 is connected between node 1544 and node 1536, the gate thereof connected to the clock signal phi1. An N-channel transistor 1550 is connected between node 1544 and $V_{SS}$, the gate thereof connected to a clock signal phi1*b*. Two series connected N-channel transistors 1552 and 1554 are connected in series between node 1536 and $V_{SS}$, the gate of transistor 1554 connected to the signal PDNB and the gate of transistor 1552 connected to a tri-state signal, TRI.

Figure 16:
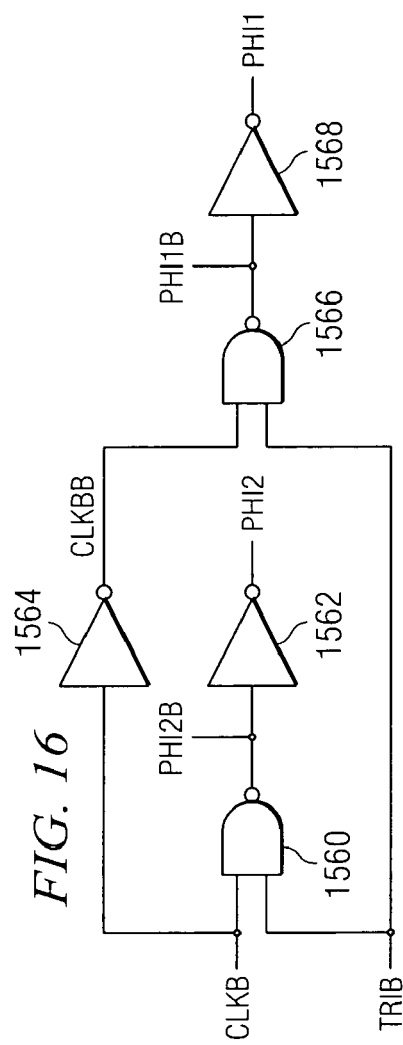
FIG. 16 illustrates a logic diagram of the clock generator for generating the clocks to drive the driving circuit of FIG. 15.

Referring now to FIG. 16, there is illustrated a logic diagram of the circuitry for generating the clock signals for the drive control block 836. The clkb signal is input to one input of a NAND gate 1560, the other input thereof connected to the inverse of the tri-state signal, TRIb. The output of NAND gate 1560 is comprised of the phi2*b* signal and is input to an inverter 1562, the output thereof comprised of the phi2 signal. The clkb signal is input to an inverter 1564, the output thereof comprising the inverted form thereof, which clkbb, which is input to one input of a NAND gate 1566, the other input thereof connected to the TRIb signal. The output of NAND gate 1566 comprises the phi1*b* clock signal and this is also input to the input of an inverter 1568, the output thereof comprised of the phi1 clock signal.

Referring now to FIG. 17, there is illustrated a schematic of the drive transistors. The P-channel transistor 508 is comprised of a large transistor that is connected between the raw $V_{DD}$ voltage on node 1702 and the output node 502. A block 1704 represents the N-channel transistor 512, which is driven by the NDRV signal on the gate thereof. This is connected between node 502 and the raw $V_{SS}$ voltage on a node 1706.

Referring now to FIG. 17A, there is illustrated a schematic diagram of the block 1704 which is comprised of an N-channel transistor 1710 having the source/drain path thereof connected between node 1706 and node 502 through a series resistor 1712.

Referring now to FIG. 18, there is illustrated a schematic diagram of the comparator 1502. Two common source P-channel transistors 1802 and 1804 have the sources thereof connected to a common node 1806, which is connected to the source/drain path of P-channel transistor 1808 to the supply terminal $V_{DD}$. The gate of transistor 1808 is connected to a node 1810. Transistor 1802 has the gate thereof connected to the positive input of the comparator and transistor 1804 has the gate thereof connected to the negative input thereof. The other side of the source/drain path of transistor 1802 is connected to one side of a diode connected N-channel transistor 1812, the other side thereof connected to $V_{SS}$ and the gate thereof connected to the gate of an N-channel transistor 1814. Transistor 1814 has the source/drain path thereof connected between $V_{SS}$ and an output node 1816 comprising the output of comparator 1502. The transistor 1804 has the other side of the source/drain path thereof connected to one side of a diode connected N-channel transistor 1816, the other side thereof connected to $V_{SS}$ and the gate thereof connected to the gate of an N-channel transistor 1818. Transistor 1818 has the source/drain path thereof connected between $V_{SS}$ and a node 1820. Node 1820 is connected to one side of the source/drain path of a diode connected P-channel transistor 1822, the other side thereof connected to $V_{DD}$. The note 1820 is connected to the gate of a P-channel transistor 1830, the source/drain path thereof connected between $V_{DD}$ and the output terminal 1816. A diode connected P-channel transistor 1832 has the source/drain path thereof connected between $V_{DD}$ and the node 1810, with an N-channel transistor 1834 connected between node 1810 and $V_{SS}$ with the gate thereof connected to PDNB. A P-channel transistor 1840 has the source/drain path thereof connected between $V_{DD}$ and the output terminal 1816 with the gate thereof connected to PDNB. Therefore, transistor 1840 will be off during normal operation and transistor 1834 will be on, such that node 1810 will be pulled low and transistor 1808 will be turned on to supply current to node 1806. The comparator 1502 is basically a zero crossing detector and determines when the minus input crosses zero.

As noted herein above, proper drive timing of the P-channel transistor 508 and the N-channel transistor 512 is critical to proper operation of the PWM modulator. In steady-state operation, it is important to note that current is continuously flowing out of the driver and through the large external inductor 414. This is true both when the output is high (inductor 414 current ramping up) and when the output is low (inductor 414 current ramping down). On a short time scale, the inductor 414 can be treated as a current source with a value near the average load current. While the dI/dt at the output is fairly low, the dI/dt on the supply and ground sides of the N-channel transistor 512 and P-channel transistor 508 is quite high, on the order of $1 \times 10^8$ Amps/second.

If the PDRV signal and NDRV signal do not overlap at all, the output will fall until the output current is supported by conduction through the N-channel substrate diode 520, resulting in massive substrate current and substrate noise. This was described herein above and this is true on both rising and falling transitions. If, however, the PDRV signal and the NDRV signal overlap too much, excess power dissipation results due to "shoot through" current directly from $V_{DD}$ to $V_{SS}$. If the drive transitions happen too quickly, this will result in a high dI/dt in the $V_{DD}$ and the $V_{SS}$ bond wires, resulting in excess power supply and ground noise. The low-to-high and high-to-low transitions are asymmetric because of the tendency for the output to fall without overlap. As such, the optimum low-to-high strategy cannot be reversed for the high-to-low transition. In general, the dynamics of both transitions are dominated by the dV/dt on the PDRV gate signal.

Figure 19A:
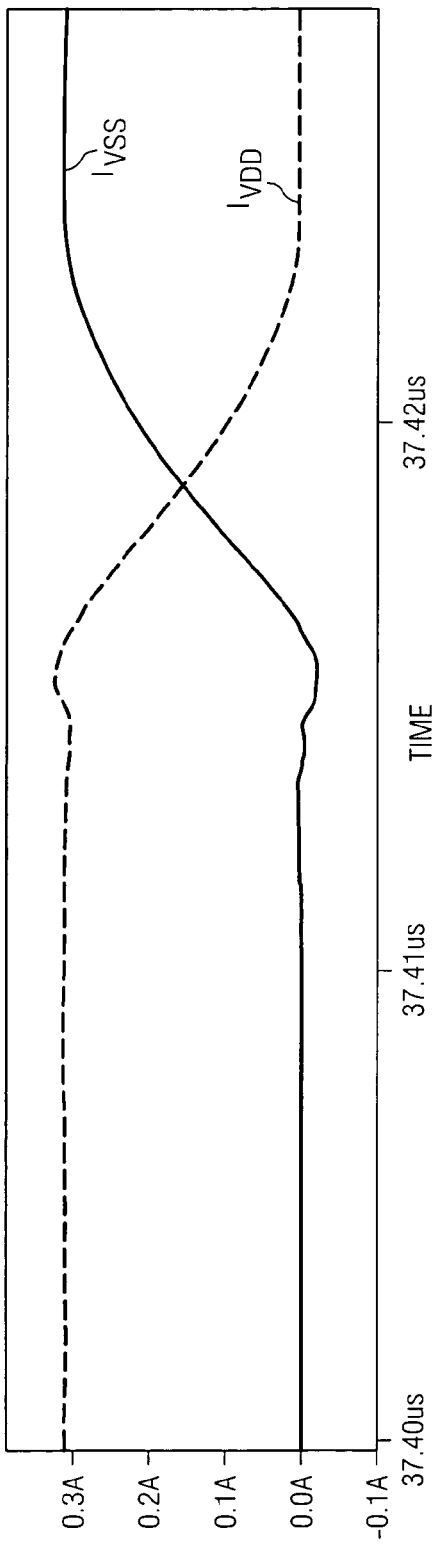
FIGS. 19A and 19B illustrate waveforms for the operation of the output drive circuit.
Figure 19B:
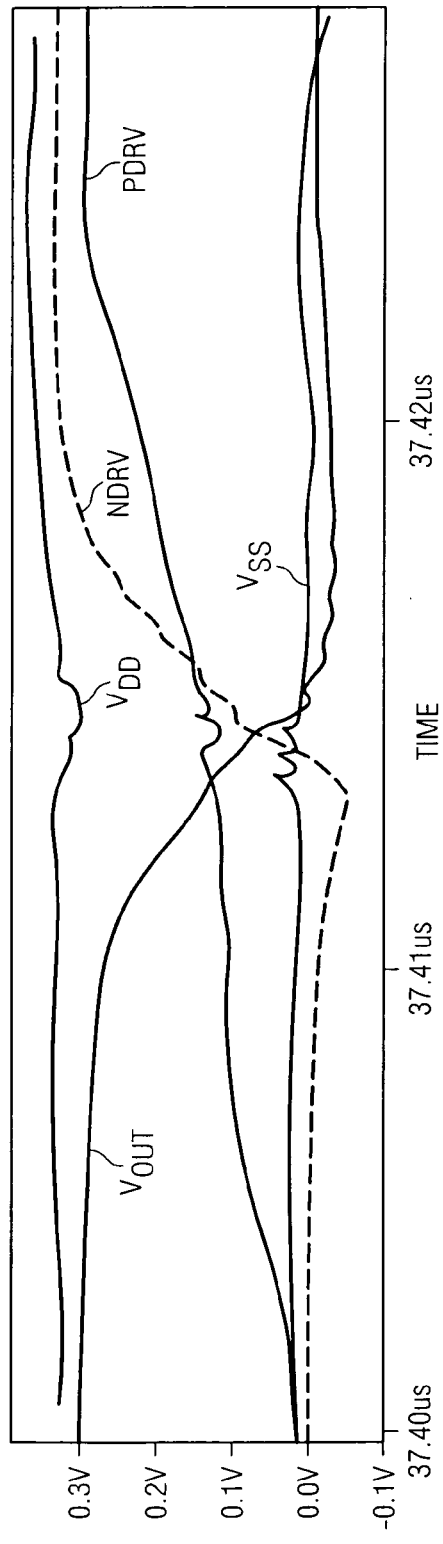

The high-to-low drive transition will now be described. Initially, the p-drive transistor 508 is on (PDRV low) and the n-drive transistor 512 is off (NDRV low). In this state, the output 502 is equal to $V_{DD}$ minus the IRdrop of the p-drive transistor 508 in triode. The p-drive signal is then "walked up" until the p-drive transistor 508 reaches the saturation point. At this point, the p-drive transistor 508 appears as a current source that just matches the current in the inductor 414. Any further increase in PDRV will cause the output to rapidly fall low. The falling output can be utilized to trip an inverter which rapidly pulls NDRV to $V_{DD}$. This is facilitated with transistor 1534. This then allows the n-drive transistor 512 to source the difference between the p-drive current in transistor 508 and the inductor current in inductor 414, thereby preventing the output from falling through to the substrate diode 520. At this point, the current is still largely coming from the p-drive transistor 508. By continuing to "walk" PDRV toward $V_{DD}$, it is possible to achieve a gradual change over in the p-drive and n-drive currents. The high-to-low timing is illustrated in wave forms of FIGS. 19A and 19B.

Figure 20A:
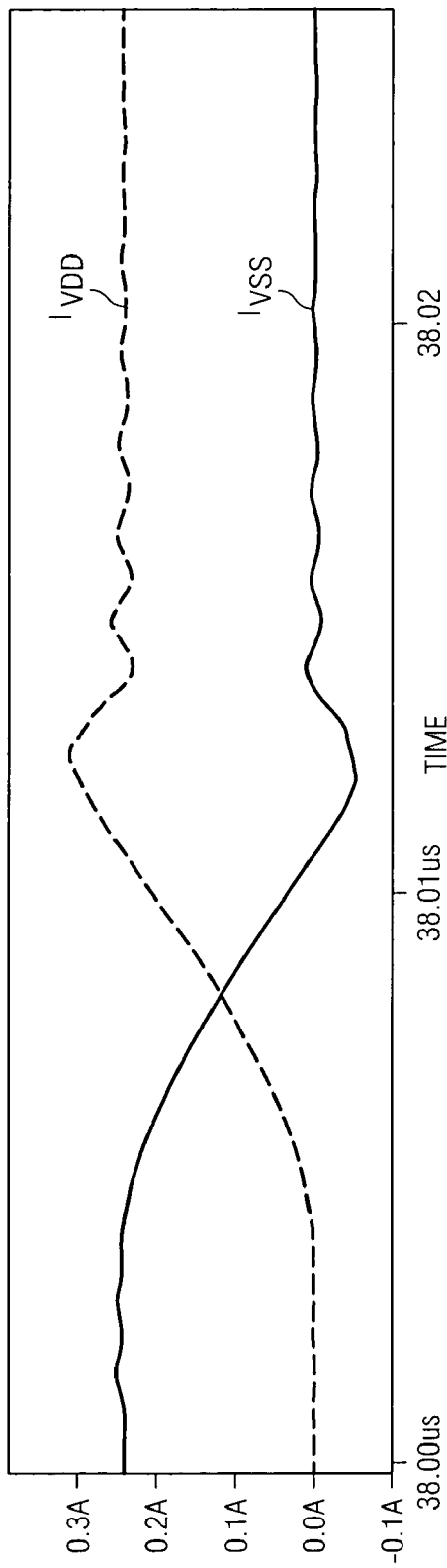
FIGS. 20A and 20 B illustrate timing diagrams for the low-to-high and high-to-low drive timing.
Figure 20B:
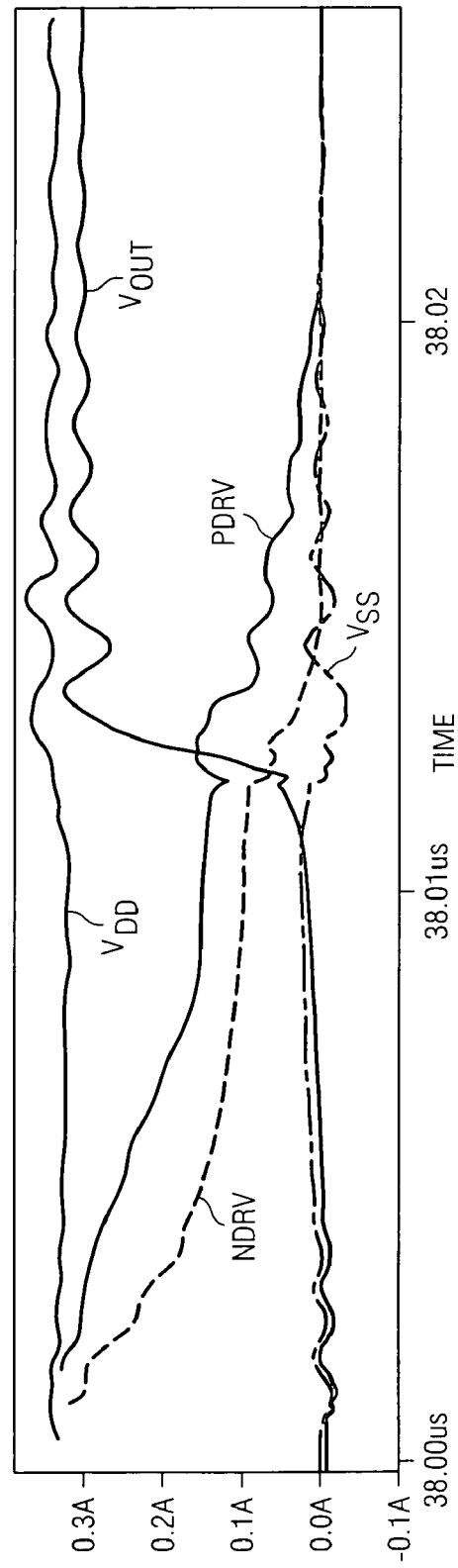

The low-to-high drive timing will now be described. Initially, the n-drive transistor 512 is on (NDRV high) and the p-drive transistor 508 is off (PDRV high). In this state, the output is equal to $V_{SS}$ minus the IRdrop of the n-drive transistor 512 in triode. The general strategy is to first (rapidly) reduce NDRV to a minimal on bias. The next step is to slowly "walk" down PDRV. When the p-drive transistor 508 turns on, it is in saturation and again appears as a current source feeding the inductor 414 "current source" with the difference coming from the n-drive transistor 512. When PDRV reaches the point where the $V_{ds}$ of the n-drive transistor 512 goes to zero, the current change over is complete. At this point, it is possible to rapidly take PDRV and NDRV low completing the transition as the output flies high. This is illustrated in the wave forms of FIGS. 20A and 20B.

Although the preferred embodiment has been described in detail, it should be understood that various changes, substitutions and alterations can be made therein without departing from the spirit and scope of the invention as defined by the appended claims.

What is claimed is:

1. A method for regulating voltage on an integrated circuit formed on a substrate to power circuitry on the substrate, comprising the steps of:
   providing an unregulated power supply as an input to the integrated circuit connected between a positive node and a reference node on the integrated circuit;
   sourcing current in a first current sourcing step through drive circuitry on the substrate from the positive node to an inductor/capacitor reactive circuit external to the integrated circuit, the output of the inductor/capacitor reactive circuit comprising a filtered regulated power supply voltage that is operable to power at least a portion of the circuitry on the substrate;
   sourcing current in a second current sourcing step through the drive circuitry on the substrate from the reference node to the inductor/capacitor reactive circuit when the current in the inductor/capacitor reactive circuit is ramping down;
   controlling the first and second sourcing steps to alternately source current to the inductor/capacitor reactive circuit from the positive and reference nodes; and
   preventing in the step of controlling substantially any current from being drawn through the substrate body during either the first current sourcing step or the second current sourcing step and delivered to the inductor/capacitor reactive circuit during ramp up or ramp down of the current in the inductor/capacitor reactive circuit and during any transition there between.

2. The method of claim 1 wherein the step of preventing comprises the step of controlling controlling the first current sourcing step and the second current sourcing step such that current driven to the inductor/capacitor reactive circuit is substantially continuous during the transition between the first and second current sourcing steps.

3. The method of claim 2 wherein the step of controlling the first current sourcing step and the second current sourcing step is operable to minimize overlap of the first and second current sourcing steps.

4. The method of claim 2 wherein the step of controlling the first current sourcing step and the second current sourcing step is operable to minimize the non-overlap of the first current sourcing step and the second current sourcing step, such that there is no gap between sourcing current to the inductor/capacitor reactive circuit from the positive node or from the reference node.

5. The method of claim 1, wherein the drive circuitry comprises CMOS switches formed on the surface of the substrate for selectively either sourcing current from the positive node to a pad on the substrate that is connected to the input of the inductor/capacitor reactive circuit in response to a first drive signal or sourcing current from the reference node through the pad to the input of the inductor/capacitor reactive circuit in response to a second drive signal, the first and second drive signals generated in the step of controlling.

6. The method of claim 5, wherein the CMOS switches are comprised of a p-channel transistor having the source-to-drain path connected between the positive node and the pad and an n-channel transistor having the source-to-drain path connected between the pad and the reference node, the gate of the p-channel transistor driven by the first drive signal and the gate of the n-channel transistor driven by the second drive signal, the first and second drive signals both controlled by the step of controlling during the transition between the first and second current sourcing steps in the step of preventing.

7. The method of claim 6, wherein the first and second current sourcing steps are not mutually exclusive.

8. The method of claim 6, wherein the n-channel transistor has associated therewith a PN semiconductor junction that forms a reverse biased diode between the pad and the reference node and the step of preventing prevents the PN junction from becoming forward biased, the substrate body connected to the reference node.

9. The method of claim 6, wherein:
   the first current sourcing step is operable to drive the gate of the p-channel transistor with a first control signal PDRV as the first drive signal;

the second current sourcing step is operable to drive the gate of the n-channel transistor with a second control signal NDRV as the second drive signal; and controlling with a controller generation of the PDRV and the NDRV signals with a pulse width modulation circuit.

10. The method of claim 6, wherein the timing of the first and second current sourcing steps and the relationship there between is different for a high to low transition and a low to high transition.

11. The method of claim 1, wherein the circuitry on the substrate includes digital processing circuitry powered by the filter regulated power supply voltage and analog circuitry contained on the surface of the substrate.

12. The method of claim 11, wherein the step of preventing is operable to prevent current from flowing proximate to the analog circuitry through the body of the substrate.

13. The method of claim 1, wherein the step of preventing is based upon the value of the drive signal to the external inductor/capacitor reactive circuit.

14. A method for providing a switching regulator as an integral part of an integrated circuit that is formed on a substrate, the integrated circuit having application circuitry associated therewith, which switching regulator interfaces with reactive elements external to the integrated circuit to provide a filtered regulated voltage for input to a regulated voltage input to the integrated circuit to power at least a portion of the application circuitry on the substrate, comprising the steps of:

providing an unregulated supply as an input to the switching regulator connected between an unregulated power supply node and a ground reference node on the integrated circuit;

controlling during a first current sourcing step a first switch disposed on the substrate to selectively source current from the unregulated power supply node to the reactive elements;

controlling during a second current sourcing step a second switch disposed on the substrate to selectively source current from the ground reference node to the reactive elements; and the steps of controlling the first and second switches timed such that substantially any current being sourced through the substrate body is prevented as current is delivered to the reactive elements during ramp up or ramp down of the voltage on the reactive elements.

15. The method of claim 14 wherein the steps of controlling the first and second switches are timed such that current sourced to the reactive elements is substantially continuous and with the current sourced by the first and second switches alternating.

16. The method of claim 15 wherein the steps of controlling the first and second switches is timed so as to minimize overlap of current sourced by the first and second switches.

17. The method of claim 15 wherein the steps of controlling the first and second switches is timed so as to minimize the non-overlap of current sourced by the first and second switches, such that there is no gap between driving current to the reactive elements from the unregulated power supply node or from the ground reference node.

18. The method of claim 14, wherein the first and second switches comprise a CMOS pair of switches formed on the surface of the substrate for selectively either sourcing current from the unregulated power supply node to a pad on the substrate that is connected to the reactive elements or sourcing current from the ground reference node through the pad to the reactive elements.

19. The method of claim 18, wherein the pair of CMOS switches is comprised of a p-channel transistor as the first switch having the source-to-drain path connected between the unregulated power supply and the pad and an n-channel transistor as the second switch having the source-to-drain path connected between the pad and the ground reference.

20. The method of claim 19, wherein the n-channel transistor has associated therewith a PN semiconductor junction that forms a reverse biased diode between the pad and the ground reference node to which the body of the substrate is connected and the steps of controlling the first and second switches is timed so as to prevent the PN junction from becoming forward biased.

21. The method of claim 14, wherein the application circuitry on the substrate includes digital processing circuitry powered by the filtered regulated power supply voltage and analog circuitry contained on the surface of the substrate.

22. The method of claim 21, wherein the steps of controlling the first and second switches is timed so as to prevent current from flowing proximate to the analog circuitry through the body of the substrate, the body of the substrate connected to the ground reference node.

23. A method for providing a switching regulator as an integral part of an integrated circuit that is formed on a substrate, the integrated circuit having application circuitry associated therewith which includes digital processing circuitry and analog circuitry contained on the surface of the substrate, which switching regulator interfaces through a pad with reactive elements external to the integrated circuit to provide a filtered regulated voltage for input to a regulated voltage input to the integrated circuit to power at least the digital processing circuitry portion of the application circuitry on the substrate, comprising the steps of:

providing an unregulated supply as an input to the switching regulator connected between an unregulated power supply node and a ground reference node on the integrated circuit, the substrate body connected to the ground reference node;

the pad having associated therewith a PN substrate diode junction to the ground reference node that is reverse biased with positive voltages;

controlling during a first current sourcing step a first switch disposed on the substrate to selectively source current from the unregulated power supply node to the reactive elements;

controlling during a second current sourcing step a second switch disposed on the substrate to selectively source current from the ground reference node to the reactive elements; and the steps of controlling the first and second switches timed such that substantially any current being sourced through the substrate body due to forward biasing of the PN substrate diode junction is prevented as current is sourced to the reactive elements during ramp up or ramp down of the voltage on the reactive elements.

24. The method of claim 23 wherein the steps of controlling the first and second switches are timed such that current sourced to the reactive elements is substantially continuous and with the current sourced by the first and second switches alternating.

25. The method of claim 24 wherein the steps of controlling the first and second switches is timed so as to minimize overlap of current sourced by the first and second switches.

26. The method of claim 25 wherein the steps of controlling the first and second switches is timed so as to minimize the non-overlap of current sourced by the first and second switches, such that there is substantially no gap between sourcing current to the reactive elements from the unregulated power supply node or from the ground reference node.

27. The method of claim 23, wherein the first and second switches comprise a CMOS pair of switches formed on the surface of the substrate for selectively either sourcing current from the unregulated power supply node to a pad on the substrate that is connected to the reactive elements or sourcing current from the ground reference node through the pad to the reactive elements.

28. The method of claim 27, wherein the pair of CMOS switches is comprised of a p-channel transistor as the first switch having the source-to-drain path connected between the unregulated power supply and the pad and an n-channel transistor as the second switch having the source-to-drain path connected between the pad and the ground reference, wherein the n-channel transistor has associated therewith a PN semiconductor junction that forms the PN substrate diode junction.

29. The method of claim 23, wherein the steps of controlling the first and second switches is timed so as to prevent current from flowing proximate to the analog circuitry from the PN substrate diode junction through the body of the substrate.

30. A regulating circuit for regulating voltage on an integrated circuit formed on a substrate to power circuitry on the substrate, comprising:
   an unregulated power supply provided as an input to the integrated circuit connected between a positive node and a reference node on the integrated circuit;
   a first current source for sourcing current through drive circuitry on the substrate from said positive node to an inductor/capacitor reactive circuit external to the integrated circuit, the output of said inductor/capacitor reactive circuit comprising a filtered regulated power supply voltage that is operable to power at least a portion of the circuitry on the substrate;
   a second current source for sourcing current through said drive circuitry on the substrate from said reference node to said inductor/capacitor reactive circuit when the current in said inductor/capacitor reactive circuit is ramping down;
   a controller for controlling said first and second current sources to alternately source current to said inductor/capacitor reactive circuit from said positive and reference nodes; and
   said controller preventing substantially any current from being drawn through the substrate body by either said first current source or said second current source and delivered to said inductor/capacitor reactive circuit during ramp up or ramp down of the current in said inductor/capacitor reactive circuit and during any transition there between.

31. The regulating circuit of claim 30 wherein said controller is operable to control said first current source and said second current source such that current driven to said inductor/capacitor reactive circuit is substantially continuous during the transition between current being sourced by said first current source and current being sourced by said second current source.

32. The regulating circuit of claim 31 wherein said controller is operable to minimize overlap of current being sourced by said first current source and current being sourced by said second current source.

33. The regulating circuit of claim 32 wherein said controller is operable to minimize the non-overlap of current being sourced by said first current source and current being sourced by said second current source, such that there is no gap between sourcing current to said inductor/capacitor reactive circuit from said positive node or from said reference node.

34. The regulating circuit of claim 30, wherein said drive circuitry comprises CMOS switches formed on the surface of the substrate for selectively either sourcing current from said positive node to a pad on the substrate that is connected to the input of said inductor/capacitor reactive circuit in response to a first drive signal or sourcing current from said reference node through said pad to the input of said inductor/capacitor reactive circuit in response to a second drive signal, said first and second drive signals generated by said controller.

35. The regulating circuit of claim 34, wherein said CMOS switches are comprised of a p-channel transistor that provides the functionality of said first current source and having the source-to-drain path thereof connected between said positive node and said pad and an n-channel transistor providing the functionality of said second current source and having the source-to-drain path thereof connected between said pad and said reference node, the gate of said p-channel transistor driven by said first drive signal and the gate of said n-channel transistor driven by said second drive signal, said first and second drive signals both controlled by said controller during the transition between current being sourced by said first current source and current being sourced by said second current source.

36. The regulating circuit of claim 35, wherein the operation of said first and second current sources steps are not mutually exclusive.

37. The regulating circuit of claim 35, wherein said n-channel transistor has associated therewith a PN semiconductor junction that forms a reverse biased diode between said pad and said reference node and said controller prevents the PN junction from becoming forward biased, the substrate body connected to said reference node.

38. The regulating circuit of claim 35, wherein:
   said controller is operable to drive the gate of said p-channel transistor with a first control signal PDRV as said first drive signal;
   said controller is operable to drive the gate of said n-channel transistor with a second control signal NDRV as said second drive signal; and
   said controller is operable to control generation of said PDRV and said NDRV signals with a pulse width modulation circuit.

39. The regulating circuit of claim 35, wherein the timing of said first and second current sources and the relationship there between is different for a high to low transition and a low to high transition.

40. The regulating circuit of claim 30, wherein the circuitry on the substrate includes digital processing circuitry powered by the filter regulated power supply voltage and analog circuitry contained on the surface of the substrate.

41. The regulating circuit of claim 40, wherein said controller is operable to prevent current from flowing proximate to the analog circuitry through the body of the substrate.

42. The regulating circuit of claim 30, wherein said controller receives as an input the value of the drive signal to said external inductor/capacitor reactive circuit, and bases the control operation in part on such value.

43. A switching regulator formed as an integral part of an integrated circuit on a substrate, the integrated circuit having application circuitry associated therewith, which switching regulator interfaces with reactive elements external to the integrated circuit to provide a filtered regulated voltage for input to a regulated voltage input to the integrated circuit to power at least a portion of the application circuitry on the substrate, comprising:

an unregulated supply provided as an input to the switching regulator connected between an unregulated power supply node and a ground reference node on the integrated circuit;

a controller for controlling during a first current sourcing operation a first switch disposed on the substrate to selectively source current from the unregulated power supply node to the reactive elements;

said controller controlling during a second current sourcing operation a second switch disposed on the substrate to selectively source current from said ground reference node to the reactive elements; and said controller timing the operations of sourcing such that substantially any current being sourced through the substrate body is prevented as current is delivered to the reactive elements during ramp up or ramp down of the voltage on the reactive elements.

44. The switching regulator of claim 43 wherein the operation of controlling said first and second switches is timed such that current sourced to the reactive elements is substantially continuous and with the current sourced by said first and second switches alternating.

45. The switching regulator of claim 44 wherein the operation of controlling said first and second switches is timed so as to minimize overlap of current sourced by said first and second switches.

46. The switching regulator of claim 44 wherein the operation of controlling said first and second switches by said controller is timed so as to minimize the non-overlap of current sourced by said first and second switches, such that there is no gap between driving current to the reactive elements from said unregulated power supply node or from said ground reference node.

47. Said switching regulator of claim 43, wherein said first and second switches comprise a CMOS pair of switches formed on the surface of the substrate for selectively either sourcing current from said unregulated power supply node to a pad on the substrate that is connected to the reactive elements or sourcing current from said ground reference node through said pad to the reactive elements.

48. Said switching regulator of claim 47, wherein said pair of CMOS switches is comprised of a p-channel transistor as said first switch having the source-to-drain path connected between said unregulated power supply and said pad and an n-channel transistor as said second switch having the source-to-drain path connected between said pad and said ground reference.

49. Said switching regulator of claim 48, wherein said n-channel transistor has associated therewith a PN semiconductor junction that forms a reverse biased diode between said pad and said ground reference node to which the body of the substrate is connected and the operation of controlling said first and second switches is timed so as to prevent the PN junction from becoming forward biased.

50. Said switching regulator of claim 43, wherein the application circuitry on the substrate includes digital processing circuitry powered by the filtered regulated power supply voltage and analog circuitry contained on the surface of the substrate.

51. Said switching regulator of claim 50, wherein the operation of controlling said first and second switches by said controller is timed so as to prevent current from flowing proximate to the analog circuitry through the body of the substrate, the body of the substrate connected to said ground reference node.

52. A switching regulator formed as an integral part of an integrated circuit that on a substrate, the integrated circuit having application circuitry associated therewith which includes digital processing circuitry and analog circuitry contained on the surface of the substrate, which switching regulator interfaces through a pad with reactive elements external to the integrated circuit to provide a filtered regulated voltage for input to a regulated voltage input to the integrated circuit to power at least the digital processing circuitry portion of the application circuitry on the substrate, comprising the steps of:

an unregulated supply provided as an input to the switching regulator connected between an unregulated power supply node and a ground reference node on the integrated circuit, the substrate body connected to said ground reference node;

the pad having associated therewith a PN substrate diode junction to said ground reference node that is reverse biased with positive voltages;

a controller for controlling during a first current sourcing operation a first switch disposed on the substrate to selectively source current from said unregulated power supply node to the reactive elements;

said controller for controlling during a second current sourcing operation a second switch disposed on the substrate to selectively source current from said ground reference node to the reactive elements; and said controller controlling the timing of the operation of said first and second switches such that substantially any current being sourced through the substrate body due to forward biasing of the PN substrate diode junction is prevented as current is sourced to the reactive elements during ramp up or ramp down of the voltage on the reactive elements.

53. The switching regulator of claim 52 wherein the operation of controlling said first and second switches is timed such that current sourced to the reactive elements is substantially continuous and with the current sourced by said first and second switches alternating.

54. The switching regulator of claim 53 wherein the operation of controlling said first and second switches is timed so as to minimize overlap of current sourced by said first and second switches.

55. The switching regulator of claim 54 wherein the operation of controlling said first and second switches is timed so as to minimize the non-overlap of current sourced by said first and second switches, such that there is substantially no gap between sourcing current to the reactive elements from said unregulated power supply node or from said ground reference node.

56. The switching regulator of claim 53, wherein said first and second switches comprise a CMOS pair of switches formed on the surface of the substrate for selectively either sourcing current from said unregulated power supply node to a pad on the substrate that is connected to the reactive elements or sourcing current from said ground reference node through said pad to the reactive elements.

57. The switching regulator of claim 56, wherein said pair of CMOS switches is comprised of a p-channel transistor as said first switch having the source-to-drain path connected between the unregulated power supply and said pad and an n-channel transistor as said second switch having the source-to-drain path connected between said pad and said ground reference, wherein said n-channel transistor has associated therewith a PN semiconductor junction that forms the PN substrate diode junction.

58. The switching regulator of claim 53, wherein the operation of controlling said first and second switches is timed so as to prevent current from flowing proximate to the analog circuitry from the PN substrate diode junction through the body of the substrate.

* * * * *

UNITED STATES PATENT AND TRADEMARK OFFICE
CERTIFICATE OF CORRECTION

| | | |
|---|---|---|
| PATENT NO. | : 6,967,471 B2 | Page 1 of 1 |
| APPLICATION NO. | : 10/754250 | |
| DATED | : November 22, 2005 | |
| INVENTOR(S) | : John James Paulos | |

It is certified that error appears in the above-identified patent and that said Letters Patent is hereby corrected as shown below:

On the Title Page Item (54) & Col. 1 line 1
In the title, delete "REGULAR" and insert --REGULATOR--, therefor.

Signed and Sealed this

Seventeenth Day of April, 2012

David J. Kappos
*Director of the United States Patent and Trademark Office*